United States Patent [19]

Holzer

[11] Patent Number: 4,998,827
[45] Date of Patent: Mar. 12, 1991

[54] COLD INDICATOR FOR CONTROLLING THE COOLING OR FREEZING OF FOODS, MEDICINES AND THE LIKE

[76] Inventor: Walter Holzer, Drosteweg 19, 7758 Meersburg, Fed. Rep. of Germany

[21] Appl. No.: 355,824

[22] Filed: May 22, 1989

[30] Foreign Application Priority Data

May 20, 1987 [DE] Fed. Rep. of Germany ....... 3716972

[51] Int. Cl.$^5$ ............................................. G01K 11/08
[52] U.S. Cl. ................................... 374/160; 116/217; 426/88
[58] Field of Search ....................... 206/820, 349, 219; 426/88; 116/216, 217; 374/160

[56] References Cited

U.S. PATENT DOCUMENTS

| Re. 25,499 | 12/1963 | Fenity et al. | 116/217 |
|---|---|---|---|
| 3,194,669 | 7/1965 | Koch | 116/217 |
| 3,701,282 | 10/1972 | Peterson | 116/216 |
| 3,756,389 | 9/1973 | Firth | 206/219 |
| 3,922,917 | 12/1975 | Ayres | 374/160 |
| 4,064,828 | 12/1977 | Clark | 116/216 |
| 4,223,043 | 9/1980 | Johson | 206/820 |
| 4,280,361 | 7/1981 | Sala | 116/216 |
| 4,327,117 | 4/1982 | Lenack et al. | 116/207 |
| 4,457,252 | 7/1984 | Manske | 116/216 |

FOREIGN PATENT DOCUMENTS

| 2736470 | 8/1976 | Fed. Rep. of Germany | 116/216 |
|---|---|---|---|
| 2239677 | 2/1975 | France | 116/217 |
| 2508164 | 12/1982 | France | 116/216 |
| 58-58015 | 12/1983 | Japan | 116/216 |
| 2119511 | 11/1983 | United Kingdom | 116/216 |

Primary Examiner—Allan N. Shoap

[57] ABSTRACT

The cold indicator serves for the controlling of the cooling or freezing condition of foods, medicines and the like in an arrangement in which it is in heat conducting contact with the observed cooling or freezing goods; for the activating of the cold indicator, a mechanical force is utilized; which destroys a separating filament. The cold indicator consists of two opposite lying chambers having different volumes, between whcih a separating filament is arranged and there is a freezable fluid provided in the smaller chamber. Below the observed temperature, the fluid forms a cooling or freezing tablet, and activating the cold indicator is done by destroying the separating filament, and the table is brought into the larger chamber. If the cold indicator is thawed, then the cooling or freezing tablet irreversibly loses its shape and disperses in the larger chamber, which is visible from the outside and indicates that the cold indicator has been thawed.

5 Claims, 1 Drawing Sheet

4,998,827

COLD INDICATOR FOR CONTROLLING THE COOLING OR FREEZING OF FOODS, MEDICINES AND THE LIKE

This application is a continuation of my prior application Ser. No. 07/195,495, filed May 18, 1988, now abandoned.

BRIEF SUMMARY OF THE INVENTION

This invention relates generally to a cold indicator of the kind that is put in contact with subject goods to indicate the freezing/thawing condition of the goods.

A cold indicator of the general kind referred to above is disclosed for example in U.S. Pat. No. 4,327,117. In the cold indicator of the patent, two reagents are arranged in a common holder that includes a sheet separating the reagents. In the cooling or freezing in the use of that cold indicator, the two reagents are solidified, and simultaneously therewith and as a result thereof, the separating sheet is destroyed. In the later thawing of the cold indicator, the two reagents react, and thereby the thawing is made visible.

Such a cold indicator is expensive to produce and difficult to handle, and it is also unreliable because of the destruction of the separating sheet.

An objective of the present invention is to further develop a cold indicator of the type mentioned at the beginning of this brief summary, that is more reliable and essentially less expensive to produce, than cold indicators heretofore known.

In achieving the objective of the invention, the device is provided with two chambers of different volumes, opposed to each other, between which is a separating sheet. In the smaller chamber a freezable fluid is positioned, and when it becomes frozen, it is moved by outside mechanical force into the larger chamber. In this step, the separating sheet is destroyed, and thereby the cold indicator is made activatable.

An essential feature of the invention is, therefore, that mutually reacting reagents are avoided, and instead, the cold indicator is activated by means of manual manipulation.

The freezable fluid is disposed in the smaller chamber, and normally it remains in non-active condition. In the use of the device, it is placed in contact with the goods to be cooled or frozen, and the fluid solidifies at its freezing point, which is pre-selected according to the composition of the fluid, and the frozen fluid remains as a "freezing tablet" is the smaller chamber.

In the use of the cold indicator, in its non-active condition, the user exerts finger pressure, from the outside, against the walls of the smaller chamber, which is flexible and yieldable, toward the larger chamber, and thereby the first mentioned wall yields and the freezing tablet is pushed through the separating sheet.

In this step, the cold indicator is activated, and the user can observe from the exterior that the frozen tablet has not yet been thawed.

Following the foregoing step, the frozen tablet, because of its solid condition assumes a dimension less than the larger chamber, but if the goods are warmed to a temperature above the freezing point of the tablet, the tablet is thawed out and it of course irreversably loses its shape and flows throughout the area of the larger chamber, thus being dispersed throughout the larger chamber which is recognizable from the exterior, this condition of course indicating the thawed condition of the goods.

The freezing/thawing point of the freezable fluid may be pre-selected according to the composition of the fluid. There are substances known that freeze below 0° C. such for example as alcohol-water mixtures, so that a corresponding lower thawing point of the goods can be indicated and the goods thereby controlled.

There are other substances also that may be used instead, indicating freezing/thawing temperatures of above 0° C.

It is preferred that the chambers in the device be arranged centrally or concentric to each other, to facilitate transfer of the frozen tablet from the smaller chamber to the larger chamber.

It is preferred that the chambers have different outer contours, and for example if the smaller chamber is round and completely filled with the fluid, it is easily observed from the exterior that the frozen tablet is centrally disposed relative to the larger chamber, thereby indicating the proper functioning condition of the cold indicator.

It is also possible to provide in the cold indicator of the present invention, that the separating sheet be of a different color from the enclosing sheet through which the frozen tablet is observed.

Additionally, it is preferred that the freezable fluid completely fill the smaller chamber, in order to avoid undesirable cavity or bubble formation in the production of the freezing tablet.

DESCRIPTION OF A PREFERRED EMBODIMENT

Figure 1:
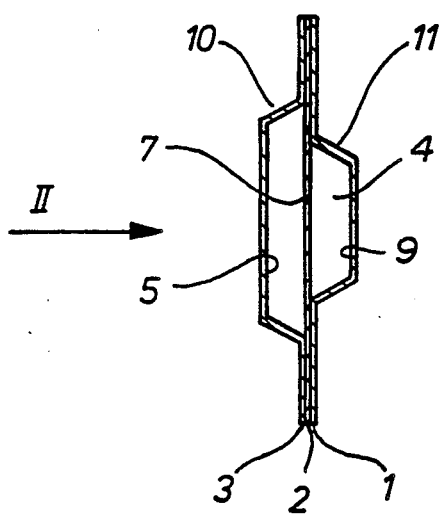
FIG. 1 is a sectional view through a cold indicator in non-activated condition.

The cold indicator illustrated in FIGS. 1-4 preferably is made of synthetic material and includes sheets 1, 3, in which chambers 9, 5, respectively are formed. These chambers may be formed by means of deep drawing, or stamping, or the like. The sheets 1, 3, are flexible and yieldable, and at least the sheet 3 is translucent in the area of the chamber 5, and preferably the sheet 1 is also translucent.

In the preferred form of the device, the chambers 5, 9, are opposed to each other, and they are separated by a separating sheet 2 that is secured between the sheets 1, 3. The separating sheet 2 is also preferably of a synthetic material, and it is also possible that the separating sheet be of different material from that in the other sheets, such for example as aluminum foil.

In non-activated condition of the cold indicator according to FIG. 1, the freezable fluid 4 is disposed in the smaller chamber 9, filling that chamber as completely as possible.

Figure 2:
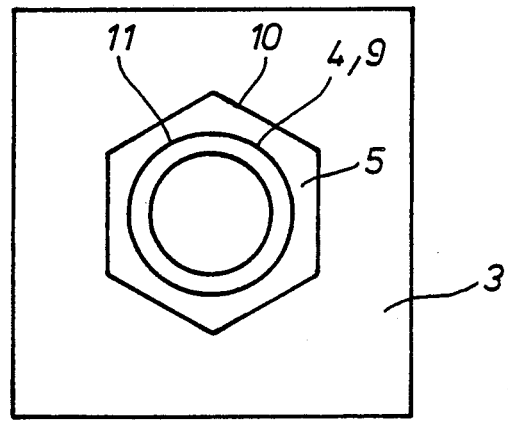
FIG. 2 is a face view of the cold indicator of FIG. 1 in the direction of the arrow I.
Figure 3:
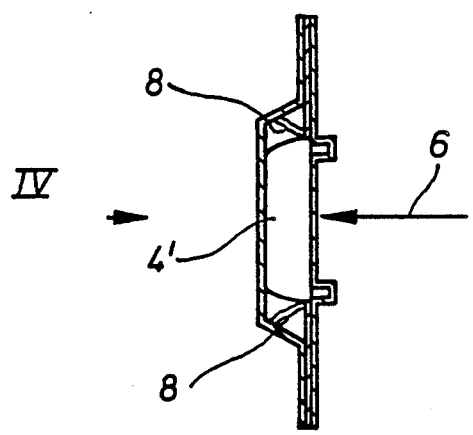
FIG. 3 is a sectional view of the cold indicator in activated condition.

Preferably the outer contours 11, 10, of the chambers 9, 5, respectively are different, and thereby the non-activated coil indicator appears as in FIG. 2, and in this condition, the fluid 4 in the smaller chamber 9 is surrounded by the empty outer peripheral portion of the chamber 5. As an example, the outer contour 11 of the smaller chamber 9 is round while the outer contour 10 of the larger chamber 5 is hexagonal. Accordingly the user can observe immediately, in looking in the direction of the arrow II in FIG. 1, that the indicator is not active, that is, the freezable fluid is held in the smaller chamber 9.

In the use of the device, in the condition thereof indicated in FIGS. 1 and 2, it is placed in heat conducting contact with the subject goods. This step is performed at the beginning of the step of cooling the goods.

The composition of the freezable fluid 4, which may be a paste, jelly, or the like, is so selected that it liquifies immediately in response to the temperature of the subject goods rising above the critical freezing point. After the subject goods are so cooled or frozen, the cold indicator is activated by finger pressure of the user, as referred to above. This finger pressure is applied in the direction of the arrow VI in FIG. 3, from the exterior against the flexible and yieldable wall 1 toward the chamber 9, and thereby the frozen freezable fluid, which is then in the form of a solid tablet, is pushed through the separating sheet 2, that sheet being destroyed, and the solid freezing tablet being pushed into the larger chamber.

Preferably, the separating sheet 2 is provided with cross sectionally weakened breaking points 7. As a result of this, portions of the separating sheet 2 enter into the chamber 5, but assume a condition of incidental residue 8 that does not however impair the functioning of the device.

As a result of this step, the cold indicator is activated and the frozen fluid, or table 4' retains its round shape, as indicated in FIG. 2, in which it will be seen that it is surrounded by the marginal portions of the larger chamber 5.

Figure 4:
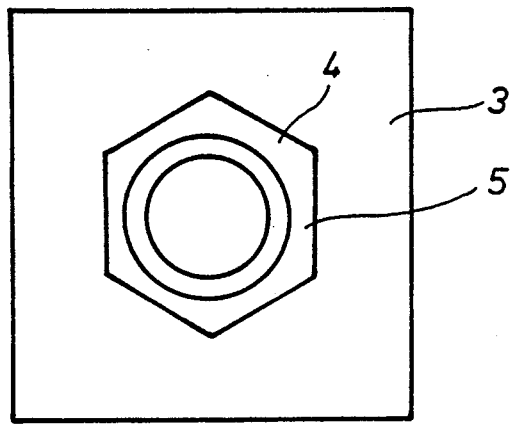
FIG. 4 is a face view of the cold indicator in activated and thawed condition, in the direction of the arrow IV in FIG. 3.

In this activated condition of the cold indicator, if the temperature to be indicated goes above the thawing point, then the frozen fluid table 4' thaws and it again becomes a fluid. This fluid than spreads out and disperses throughout the larger chamber 5, and the appearance is then as indicated in FIG. 4, where the user can observe that the fluid has spread throughout the entire area of the larger chamber.

Thus, according to the concept of the invention a frozen table is moved into a larger chamber having a volume larger than that of the tablet, so that when the tablet is thawed, the material of the tablet is distributed throughout the area of the larger chamber, this distribution constituting a visual indication that the cold indicator has been thawed.

DRAWINGS - LEGENDS

1. Sheet
2. Separating sheet
3. Sheet
4. Fluid 4' Cooling or freezing tablet
5. Chamber
6. Direction of the Arrow
7. Predetermined breaking point
8. Residue
9. Chamber
10. Outer contour (chamber 5)
11. Outer contour (chamber 9)

I claim:

1. Cold indicator for indicating the freezing/thawing condition of goods including goods in the use of which it is put in heat conducting contact with the goods, comprising, a pair of opposed sheets secured together, including a first sheet and a second sheet, having chambers with their open sides mutually opposed, at least the second sheet being transluecent in the area of the chamber therein, a thin breakable separating sheet positioned between the opposed sheets, the chamber in the first sheet being smaller than the chamber in the second sheet, and there being a freezable fluid in that smaller chamber, at least the first sheet being yieldable in reponse to mechanical pressure applied against it from outside the indicator substantially at the location of the smaller chamber in the first sheet, the separating sheet being breakable under that pressure and enabling the freezable fluid, when frozen, to be moved thereby into the larger chamber in the second sheet, and the chamber in the second sheet being devoid of any other materials thereby enabling the frozen fluid to move freely and fully into that chamber effectively into engagement with the second sheet without any other materials therebetween.

2. Cold indicator according to claim 1 wherein, the first sheet is also flexible.

3. Cold indicator according to claim 1 wherein, the fluid (4) fills the smaller chamber (9).

4. Cold indicator according to claim 1 wherein, the separating sheet (2) includes weakened points forming breaking points (7) in the region of the connection between the chambers (5,9).

5. Cold indicator for indicating the cooling or freezing condition of goods, and operable when in head conducting contact with the observed cooling or freezing goods, wherein, the cold indicator consists of two opposite lying chambers (5, 9) having different volumes, between which a separating sheet (2) is arranged, in the smaller chamber a freezable fluid (4) is provided, the freezable fluid when frozen being capable of being moved from the smaller chamber into the larger chamber by means of an outside mechanical force, and because of, and after, the resulting movement, the separating sheet is destroyed and the cold indicator is thereby rendered activatable, each chamber (5, 9) is formed as a stamping in a corresponding synthetic sheet (3, 1), and between the two synthetic sheets (1, 3) said separating sheet (7) is arranged, and the sheets (1, 3, 7) are connected together outside of the region of the chambers (5, 9), and the larger chamber (5) is hexagonal in shape and is translucent and the smaller chamber (9) is circular in shape.

* * * * *